US006359847B1

(12) United States Patent
Shimizu

(10) Patent No.: US 6,359,847 B1
(45) Date of Patent: Mar. 19, 2002

(54) METHOD AND APPARATUS FOR OFFSET-PROOF LIGHT BEAM INTENSITY CONTROL IN AN OPTICAL DISK DRIVE

(75) Inventor: Toshiki Shimizu, Tanashi (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/483,112

(22) Filed: Jan. 14, 2000

(30) Foreign Application Priority Data

Jan. 18, 1999 (JP) .......................................... 11-008882

(51) Int. Cl.$^7$ .............................................. G11B 7/125
(52) U.S. Cl. ................. 369/53.26; 369/53.27; 369/116
(58) Field of Search ............................. 369/116, 53.26, 369/53.27, 26

(56) References Cited

U.S. PATENT DOCUMENTS 4,890,274 A * 12/1989 Kaneko et al. ............... 369/45
5,342,714 A * 8/1994 Ide ............................ 430/19
5,867,463 A * 2/1999 Chiba .......................... 369/54
5,963,532 A * 10/1999 Hajjar ......................... 369/112

* cited by examiner

Primary Examiner—W. R. Young
Assistant Examiner—Gautam R. Patel
(74) Attorney, Agent, or Firm—Woodcock Washburn LLP

(57) ABSTRACT

In recording on an optical disk of the write-once variety, the light beam is switched to write intensity during the durations of write pulses and to read intensity during their spacings. The read intensity beam reads the wobbling pregroove in the disk for tracking control, disk speed control, track address detection, and so forth. A beam Intensity control system is provided for constantly holding the read intensity, as well as write intensity, of the laser beam at a target value. Included are a read intensity target generator for generating a read intensity target signal, and a read intensity control circuit for supplying to a laser driver circuit a read intensity control signal indicative of the difference between the read intensity target signal and an actual read intensity signal. The read intensity target generator is improved for detecting an offset component included in the read intensity control signal for a system offset, and for amending the read intensity target signal so as to cancel the detected offset component.

13 Claims, 14 Drawing Sheets

METHOD AND APPARATUS FOR OFFSET-PROOF LIGHT BEAM INTENSITY CONTROL IN AN OPTICAL DISK DRIVE

BACKGROUND OF THE INVENTION

The present invention relates generally to an apparatus for data transfer with a rotating data storage disk, particularly an optical disk, and more particularly a recordable compact disk (CD-R), or an optical disk of the known write-once variety, on which data can be written once and read many times. Still more particularly, the invention pertains to improvements in an automatic laser power control (ALPC) conventionally included in an optical disk drive for holding constant the intensity of the light beam scanning the disk, specifically dealing with how to optimize the target value at which the beam intensity is to be held during reading, rather than writing, against the unavoidable offset of the control system.

An unused CD-R, commercially available today, has a preformed groove, or pregroove, cut in its surface in the form of a multiturn spiral, along which the light beam is to be guided for writing. Irradiating the pregroove, the light beam provides a tracking error signal which is used for tracking control, that is, for keeping the beam spot centered on the track. The pregroove slightly "wobbles" in a regular zigzag fashion, such that when the beam scans it at a prescribed linear velocity for writing, the tracking error signal includes a wobble component with a standard frequency of 22.05 kHz.

The tracking error signal with the wobble component serves some important purposes in addition to tracking control. One of them is disk speed control. The disk speed is servo controlled so as to maintain the wobble signal at 22.05 kHz. Another purpose is the provision of the positional information of the beam spot on the disk. The wobble frequency on the disk is frequency modulated at 22.05 kHz±1 kHz to include track address information known as ATIP (absolute time in pregroove). This address information is therefore derivable from the wobble component of the tracking error signal.

Recording on CD-Rs is done under the control of write pulses. User data is written during the durations of the write pulses, and the wobbling pregroove is read during the pulse spacings to provide the tracking error signal with the wobble component. Writing is alternate, or almost concurrent, with reading. The light beam tracing the pregroove is alternately switched between write intensity and read intensity with the progress of alternate writing and reading.

It has been known and practiced widely to incorporate an ALPC in optical disk drives in order to keep constant the intensities of the light beam scanning the disk. The ALPC is known to reduce fluctuations in the light beam intensities due to changes in ambient temperature, deterioration of the parts with the lapse of time, and other causes, contributing to more reliable performance of the related servos and signal processing systems.

The prior art ALPC (shown in FIG. 1 of the drawings attached hereto) has had a problem left unsolved in connection with the offset unavoidably arising in the control system for various reasons, among them being the over- and undershooting of the output waveform of the photodetector monitoring the light beam intensity. In the absence of any countermeasures the offset could make the ALPC incapable of holding the light beam at a desired write intensity and a desired read intensity. As regards the write beam intensity, it has been suggested to determine, immediately before recording, an optimum target value at which the write beam is to be held in the succeeding recording session. The effects of the system offset has proved to be virtually eliminated through optimization of the write target value in consideration of the offset existing at that time.

Concerning the read beam intensity, however, no such preliminary optimization against offset has so far been practiced. Pregroove reading during writing is no negligible matter, being intended as aforesaid for the important functions of tracking control, track address detection, and so forth. Accurate execution of these functions has in some cases been seriously hampered by undesired deviations of the read beam intensity from the target value due to offset.

SUMMARY OF THE INVENTION

The present invention has it as an object, in an data transfer apparatus for use with a rotating optical disk, to make the intensity of the light beam unaffected by system offsets due to various possible causes noted above.

Another object of the invention is to optimize the intensity of the light beam reading the wobbling pregroove in an optical disk for accurate tracking control, disk speed control, track address detection, and other purposes.

Another object of the invention is to make it possible for the user to readily update the read beam intensity target.

A further object of the invention is to make it possible for the user to determine an optimum read beam intensity target for the particular write beam intensity target to be used subsequently in recording.

Briefly, the present invention may be summarized, in an apparatus utilizing a beam of light for optically writing and reading information on a rotating disk, a light beam intensity control system comprising a driver circuit connected to a light source for causing the same to emit a light beam of consistently read intensity or, in response to write pulses, of alternating write intensity and read intensity. A write intensity control circuit is provided for finding a difference between an actual write intensity signal, indicative of the actual write intensity of the light beam, and a write intensity target signal indicative of a target value at which the write intensity of the light beam is to be held. The write intensity control circuit is connected to the driver circuit for causing the same to control the write intensity of the light beam according to the difference found. Also connected to the driver circuit is a read intensity control circuit for applying thereto a read intensity control signal thereby to cause the driver circuit to control the read intensity of the light beam according to a difference between an actual read intensity signal and a read intensity target signal.

The invention particularly deals with the improved construction of a read intensity target generator for generating the noted read intensity target signal indicative of a target value at which the read intensity of the light beam is to be held. The improved read intensity target generator comprises means connected to the read intensity control circuit for detecting an offset component of the read intensity control signal, and means for amending the read intensity target signal so as to cancel the detected offset component of the read intensity control signal.

An offset will occur for various reasons other than the over- and undershooting of the monitoring waveform of the light beam intensity. Therefore, according to more specific aspects of the invention, the offset is first detected while the light beam is held in consistently read intensity. Then, after compensating for the offset thus detected, offset detection is again made by switching the light beam between read and write intensities at the same rate as in recording on the disk, and the read intensity target is amended and optimized accordingly.

With the read beam target optimized in this manner, the read beam will be stably maintained at that target intensity as it reads the wobbling pregroove in subsequent recording on the disk. Accurately reading the information, the stable intensity read beam will enable proper execution of the functions for which it is intended. Moreover, since the read beam intensity control system according to the invention tolerates some over- and undershooting of the monitoring waveform, no expensive wave form amplifier and the like are required.

According to another important feature of the invention, in detecting the offset while the light beam is being switched between read and write intensities as above, the read intensity target is amended at two different notional write intensity targets above and below, respectively, the actual intended write intensity target to be used in subsequent recording. The optimum read intensity target for the actual write intensity target is computed subsequently by a prescribed expression using the amendments made on the normal read target at the two notional write intensity targets.

The overshooting of the monitoring waveform is proportional to the write intensity. The read intensity target may be optimized in this manner for any write intensity target intended for use. Carried out in a minimal period of time prior to recording, the read intensity target optimization according to the invention is not to interfere with actual recording in any way.

The above and other objects, features and advantages of this invention and the manner of achieving them will become more apparent, and the invention itself will best be understood, from a study of the following description and attached claims, with reference had to the accompanying drawings showing the preferred embodiments of the invention.

DETAILED DESCRIPTION

Figure 1:
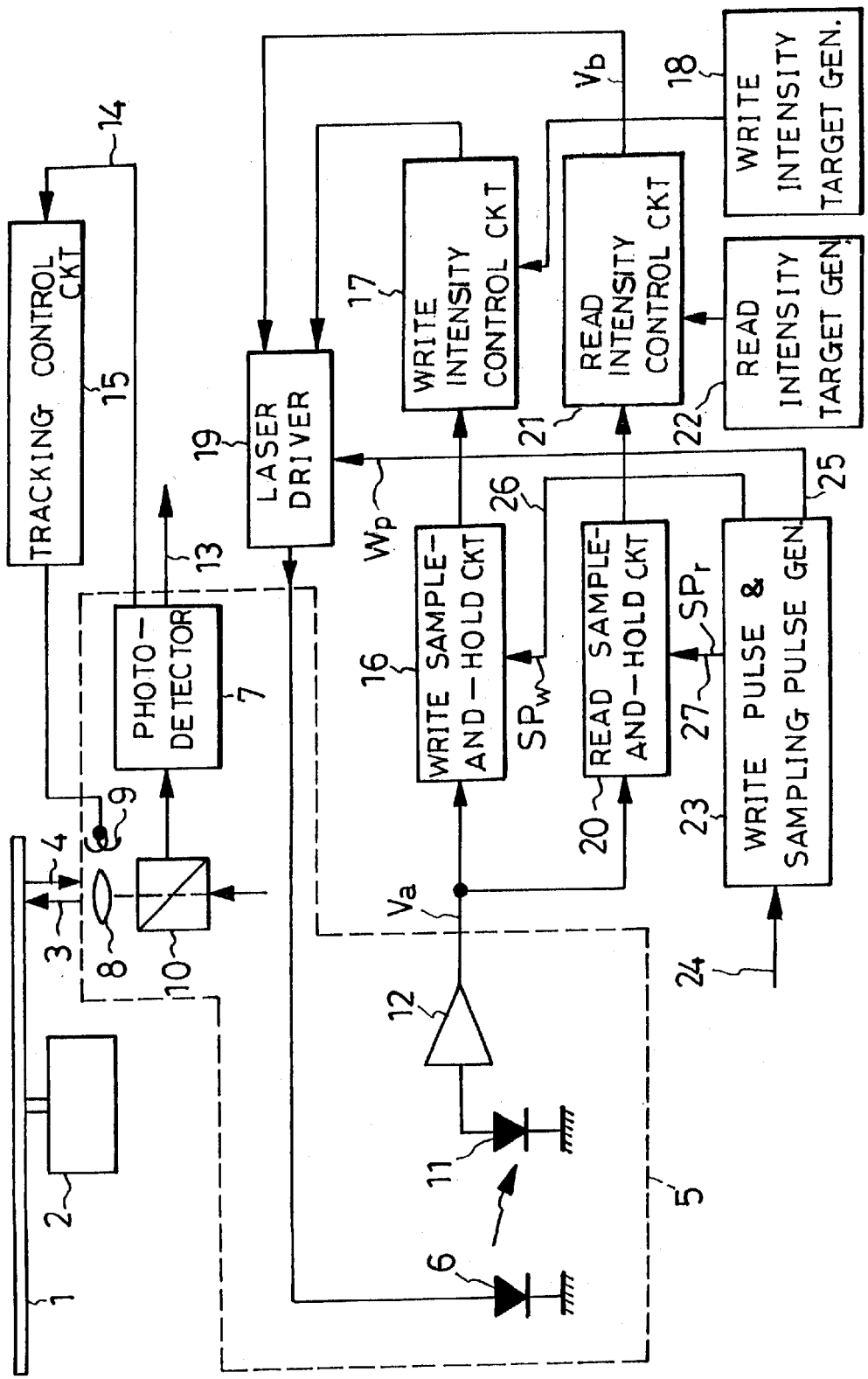
FIG. 1 is a block diagram of the prior art laser beam intensity control system in a CD-R drive.

A typical prior art CD-R drive, particularly its ALPC circuit, will be described in some detail with reference to FIG. 1, the better to clarify the features and advantages of the instant invention. At 1 in this figure is shown a CD-R, an optically writable and readable disk, in its preassigned working position to be driven directly by an electric disk drive motor 2. The disk 1 has a multiturn spiral pregroove cut in its surface shown directed downwardly in this figure. An optical transducer assembly 5 is disposed under the disk 1 for emitting a light beam 3 directed toward the pregrooved disk surface and for receiving the reflection 4 of the light beam therefrom.

The optical transducer assembly 5 comprises a light source shown as a diode laser 6, a photodetector 7 for detecting the beam reflection 4, an objective lens 8, a tracking actuator 9 coupled to the objective 8 for keeping the beam on the track on the disk 1, a beam splitter 10 positioned between photodetector 7 and objective 8, a monitoring photodetector 11 for automatic laser power control, which is shown as a photodiode, and an amplifier 12 connected to the monitoring photodetector 11. It is understood that the transducer assembly 5 additionally comprises a focusing actuator, various optical elements other than those shown, a preamplifier, wobbling control means, and so forth, which are all not shown because of their conventional nature and irrelevance to the present invention.

Inputting the beam reflection 4 from the beam splitter 10, the photodetector conventionally puts out on a line 13 a read data signal indicative of data that has been read from the disk 1, on a line 14 a tracking error signal indicative of the departure of the beam spot from the track, and on an additional line, not shown, a focusing signal indicative of the degree of beam defocusing on the disk. A tracking control circuit 15 responds to the incoming tracking error signal by causing the tracking actuator 9 to move the objective 8 so as to keep the beam spot centered on the disk track.

The ALPC circuit comprises a first sample-and-hold circuit 16, a first driver control voltage generating circuit 17 as a write intensity control circuit, a first target generator 18 for providing a target value at which the beam intensity is to be held during writing, a diode laser driver circuit 19, a second sample-and-hold circuit 20, a second driver control voltage generating circuit 21 as a read intensity control circuit, a second target generator 22 for providing a target value at which the beam intensity is to be held during reading, and a write pulse and sampling pulse generating circuit 23.

The first sample-and-hold circuit 16, first control voltage generating circuit 17, and first target generator 18 all take part in laser power control during writing, so that they will be hereinafter referred to as the write beam sample-and-hold circuit, the write beam control voltage generating circuit, and the write beam intensity target generator, respectively. The second sample-and-hold circuit 20, second control voltage generating circuit 21, and second target generator 22 take part in laser power control during reading, so that they will be hereinafter referred to as the read beam sample-and-hold circuit, the read beam control voltage generating circuit, and the read beam intensity target generator, respectively. The laser driver circuit 19 and the write pulse and sampling pulse generating circuit 23 are common to both purposes, as will become better understood as the description proceeds.

Figure 2:
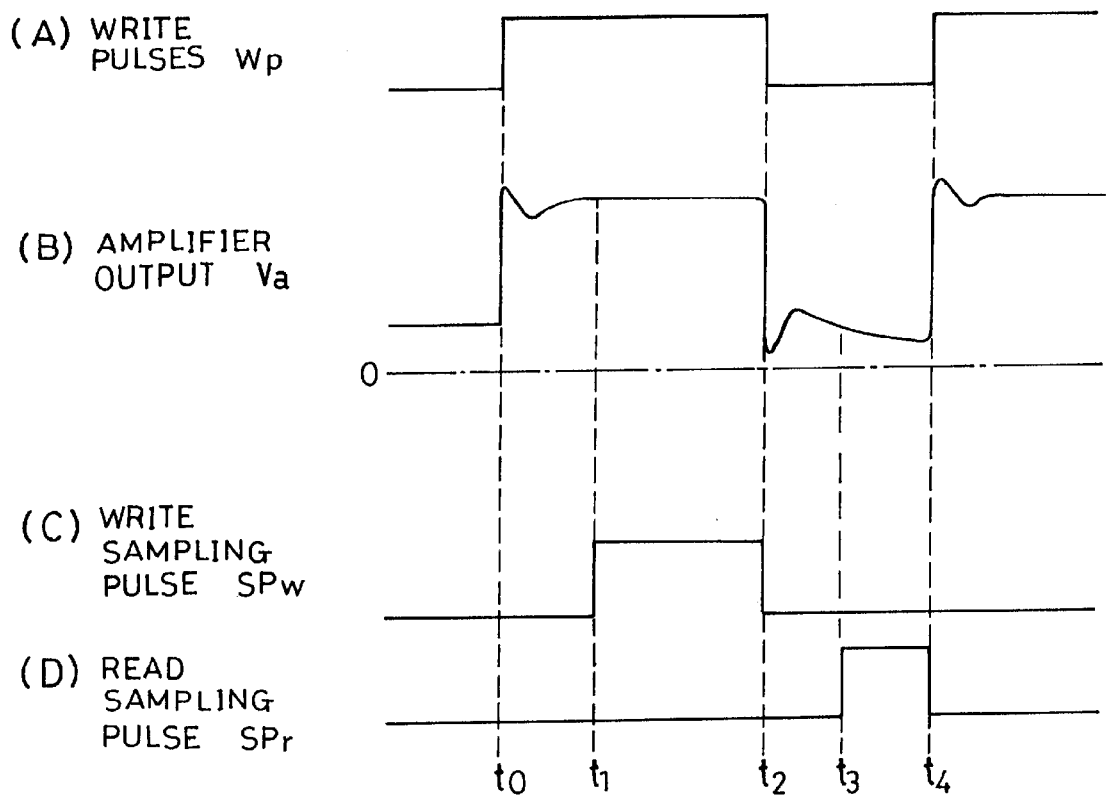
FIG. 2, consisting of (A) through (D), is a diagram of waveforms appearing in various parts of the FIG. 1 system.

During writing, with virtually concurrent pregroove reading, the write pulse and sampling pulse generating circuit 23 provides write pulses $W_p$, shown at (A) in FIG. 2, for delivery to the laser driver circuit 19 over a line 25. The driver circuit 19 supplies a current (power) of write magnitude (i.e. magnitude suitable for writing) to the diode laser 6 during the duration of each write pulse, as from $t_0$ to $t_2$ in FIG. 2, and a current of read magnitude to the diode laser during each write pulse spacing, as from $t_2$ to $t_4$ in FIG. 2. The read magnitude is much less than the write magnitude. The write pulses correspond to data of a line 24.

With the laser 6 driven as above, data will be recorded on the disk 1 as the beam 3 of write intensity, corresponding to the write magnitude of the output from the driver circuit 19, creates optical pits along the grooved track thereon during the durations of the FIG. 2(A) write pulses. During the write pulse spacings, on the other hand, the photodetector 7 will detect the reflection 4 of the read intensity beam 3. This beam reflection will contain tracking information (i.e. lateral position of the beam relative to the track), track address information, focusing information, and write error information. Data is therefore written with the concurrent progress of tracking control, focusing control, address detection, and error detection.

The ALPC circuit forms a feedback control loop for causing the diode 6 to emit stably the beam of prescribed write intensity and read intensity. Included in this feedback control loop is the noted monitoring photodetector 11 forming a part of the transducer assembly 6. Irradiated by the laser 6, the monitoring photodetector 11 will put out a current output representative of the laser beam intensity. The amplifier 12 will provide a voltage output proportional to the current output from the monitoring photodetector 11.

At (B) in FIG. 2 is shown the output voltage $V_m$ from the amplifier 12. It will be observed that the waveform of this amplifier output voltage $V_m$ is an approximate replica of the actual laser beam intensity. This showing of FIG. 2(B) is somewhat idealized, however. In practice the amplifier output voltage Va will have more pronounced overshoots and undershoots, particularly when the response of the amplifier is made higher for higher speed writing, thereby giving rise to the difficulties to be pointed out subsequently.

Connected to the output of the amplifier 12, the write beam sample-and-hold circuit 16 is enabled by each write sampling pulse $SP_w$, FIG. 2(C), fed from the write pulse and sampling pulse generating circuit 23 over a line 26, to measure the FIG. 2(B) amplifier output voltage Va, as during the $t_1$–$t_2$ duration of one representative write sampling pulse shown, and to hold the measurement. Since the $t_1$–$t_2$ period is included in the $t_0$–$t_2$ duration of one representative write pulse $W_p$, the sample now being held by the write beam sample-and-hold circuit 16 represents the actual laser beam intensity during writing.

Also connected to the output of the amplifier 12, the read beam sample-and-hold circuit 20 is enabled by each read sampling pulse $SP_r$, FIG. 2(D), fed from the write pulse and sampling pulse generating circuit 23 over a line 27, to measure the FIG. 2(B) amplifier output voltage $V_m$, as during the $t_3$–$t_4$ duration of one representative read sampling pulse shown, and to hold the measurement. The $t_3$–$t_4$ interval is included in the $t_2$–$t_4$ spacing between the two write pulses $W_p$ shown, so that the sample now being held by the read beam sample-and-hold circuit 20 indicates the actual laser be am intensity during reading.

The write beam control voltage generating circuit 17 comprises a differential amplifier, a low-pass filter for smoothing the output from the amplifier, and a voltage generating circuit. In combination they function to provide a voltage proportional to the difference between the output from the write beam sample-and-hold circuit 16, indicative of the actual laser beam intensity during writing, and the output from the write beam intensity target generator 18, indicative of the desired laser beam intensity during writing. The driver circuit 19 responds to this voltage output from the write beam control voltage generating circuit 17 by correspondingly energizing the laser diode 6, causing the same to generate a beam of the desired write intensity during the duration, as from $t_0$ to $t_2$ in FIG. 2, of each write pulse $W_p$.

The read beam control voltage generating circuit 21 is of like construction capable of producing a voltage proportional to the difference between the output from the read beam sample-and-hold circuit 20, indicative of the actual laser beam intensity during reading, and the output from the read beam intensity target generator 22, indicative of the desired laser beam intensity during reading. The driver circuit 19 responds to this voltage output from the read beam control voltage generating circuit 21 by energizing the laser diode 6 accordingly, causing the same to generate a beam of the desired read intensity during the spacings, as from $t_2$ to $t_4$ in FIG. 2, of the write pulses $W_p$.

Let it be assumed that in the prior art ALPC system of FIG. 1, the frequency response of the amplifier 12 is enhanced for high speed writing. Then, as depicted at (A) in FIG. 3,the output voltage $V_m$ of this amplifier will have inconveniently great overshoots and undershoots during the read intervals, as from $t_2$ to $t_4$. How the amplifier output voltage overshoots or undershoots depends also on write speed and beam intensity. If the $t_3$–$t_4$ section of the read interval part $t_2$–$t_4$ of this amplifier output voltage $V_m$ is sampled in response to the read sampling pulse $SP_r$ of FIG. 3(B), and the mean value of this section taken as a sample by the read beam sample-and-hold circuit 20, then this sample of the read beam intensity will be found by the read beam control voltage generating circuit 21 to be higher than the target value during reading. The laser driver circuit 19 will respond to the resulting output from the read beam control voltage generating circuit 21 by making the beam intensity even lower.

As the prior art ALPC thus fails to maintain the read beam at the desired intensity, the tracking control, focusing control, and address detection will also fail to function correctly. These functions will deteriorate greatly even at relatively small deviations of the read beam intensity because the beam intensity is far less as aforesaid during reading than during writing. Similar malfunctioning of the prior art ALPC has also occurred in the event of change, due to ambient temperature variations or the lapse of time, in the frequency response of the amplifier 12 or the offset induced by the read intensity sample-and-hold circuit 20 or the read beam control voltage generating circuit 21.

FIRST EMBODIMENT OF THE INVENTION

Figure 4:
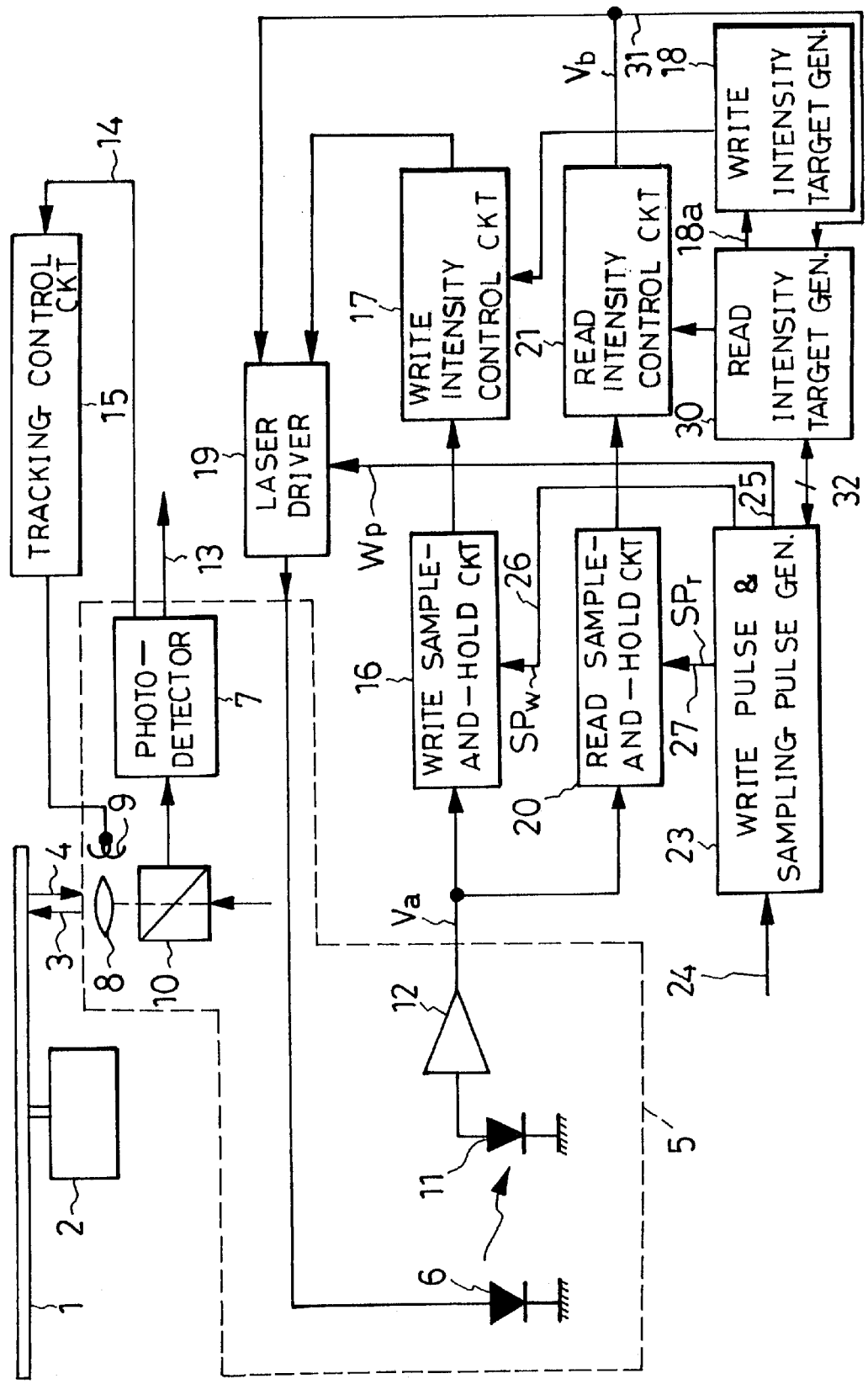
FIG. 4 is a block diagram of the improved laser beam intensity control system according to the present invention.

FIG. 4 illustrates the first preferred embodiment of the present invention. Parts of the representative optical disk drive depicted here are identified by the same reference characters as used to denote the corresponding parts, if any, of the prior art device shown in FIG. 1. A comparison of FIGS. 1 and 4 will reveal that the optical disk drive according to the invention differs from the prior art in the details of the read beam intensity target generator 30 as well as its electrical connections to some other parts.

Unlike its FIG. 1 counterpart 22 the improved read beam intensity target generator 30 according to the invention is equipped to provide an optimum target value of read beam intensity against the offset component of the output from the read beam control voltage generating circuit 21. Toward this end the read beam intensity target generator 30 has an input connected to the read beam control voltage generating circuit 21 by way of a line 31. A bus 32 connects the read beam intensity target generator 30 to the pulse generating circuit 23 for enabling the target generator to utilize the write pulses and sampling pulses for providing an optimum read beam intensity target. Additionally, the read beam intensity target generator 30 is connected to the write beam intensity target generator 18 by way of a line 18a for computation of an optimum read beam intensity target in relation to the write beam intensity target being generated, as will be detailed presently.

Figure 5:
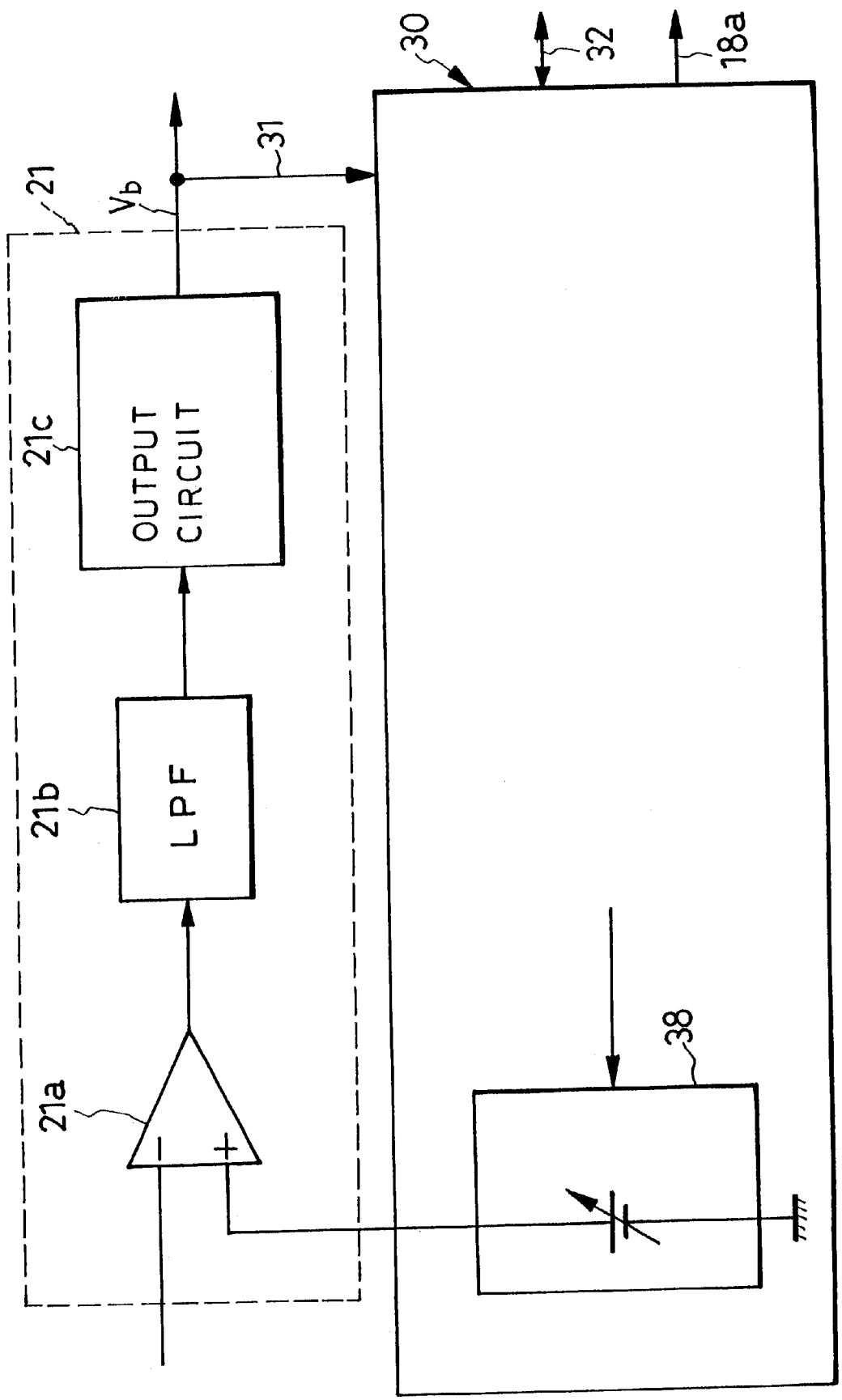
FIG. 5 is a somewhat more detailed block diagram of the read beam intensity control circuit of the FIG. 4 system shown together with the read intensity target generator.

FIG. 5 is explanatory of the construction of the read beam control voltage generating circuit 21 in relation to the improved read beam intensity target generator 30. The voltage generating circuit 21 is herein shown as a serial connection of a differential amplifier 21a, a lowpass filter (LPF) 21b and a voltage output circuit 21c The differential amplifier 21a has an input connected to the read beam sample-and-hold circuit 20, FIG. 4, and another input connected to a digital-to-analog converter (DAC) 38 which is included in the improved read beam intensity target generator 30 for putting out the amended target value in analog voltage form. This DAC could, however, be equivalently depicted as a variable voltage source.

The LPF 21b attenuates an unnecessarily high frequency component that will be contained in the output from the differential amplifier 21a, that output being representative of the possible difference between the beam intensity sample output from the read beam sample-and-hold circuit 20 and the amended target value of beam intensity from the DAC 38. The resulting output from the LPF 21b is translated by the voltage output circuit 21c into the laser beam driver control voltage $V_b$ for holding the laser beam at the target intensity. The driver control voltage $V_b$ is applied not only to the laser driver circuit 19, FIG. 4, but to the improved read beam intensity target generator 30 as well. The driver circuit 19 energizes the laser 6 as required by the Incoming control voltage $V_b$. Despite the showing of FIG. 5 the voltage output circuit 21c could be connected between differential amplifier 21a and LPF 21b, preferably formed Integral with the differential amplifier.

Figure 6:
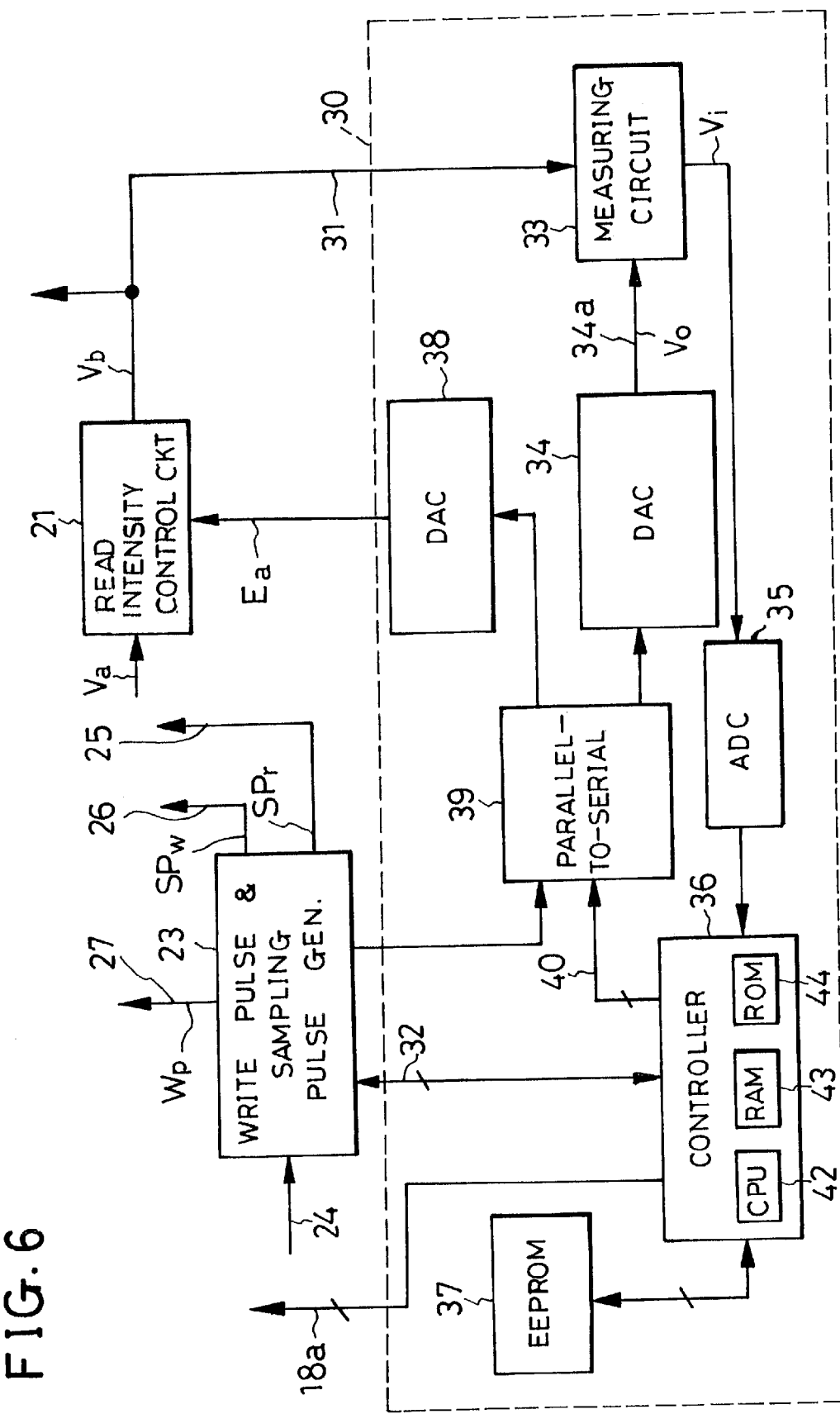
FIG. 6 is a detailed block diagram of the read intensity target generator of the FIG. 4 system shown together with its electrical connections to some other circuits.

The improved read beam intensity target generator 30 is illustrated in more detail in FIG. 6 together with its electric connections to the read beam control voltage generating circuit 21 and the write pulse and sampling pulse generating circuit 23. The read beam intensity target generator 30 comprises a laser driver control voltage measuring circuit 33, a DAC 34 for offset compensation, an analog-to-digital converter (ADC) 35, a controller 36 in the form of a microcomputer or microprocessor, a target storage 37 in the form of an electrically erasable programmable read-only memory (EEPROM), the noted DAC 38, and a parallel-to-serial converter (PSC) 39.

Figure 8:
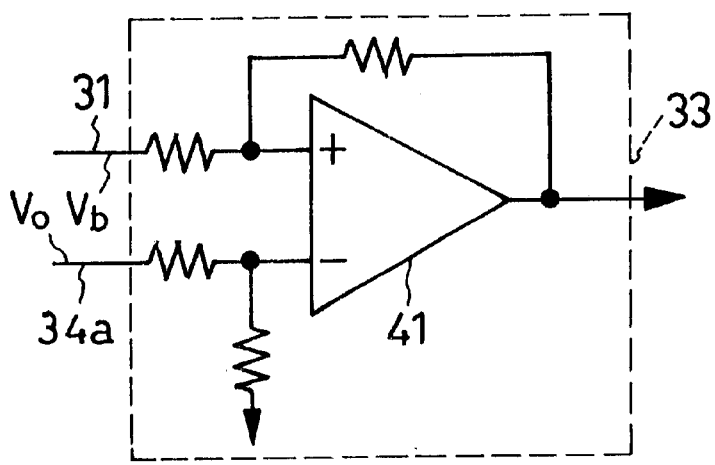
FIG. 8 is a schematic electrical diagram of the read intensity control voltage measuring circuit included in the FIG. 6 read target generator.

The control voltage measuring circuit 33 is, in essence, a differential amplifier circuit configured as in FIG. 8. Included is an operational amplifier 41 having a first input connected to the voltage output circuit 21c, FIG. 5, of the read beam control voltage generating circuit 21 by way of the line 31, and a second input connected to the DAC 34, FIG. 6, of the read beam intensity target generator 30 by way of a line 34a.

With reference back to FIG. 6 the DAC 34 is used both for offset measurement and for compensation for the measured offset. During offset measurement the DAC 34 puts out under feedback control a reference voltage for setting the output voltage of the control voltage measuring circuit 33 at a prescribed value of, say, 2.5 volts. After offset measurement the DAC 34 holds and puts out the offset voltage measurement.

The control voltage measuring circuit 33 subtracts the offset voltage $V_o$ on the line 34a from the laser driver control voltage $V_b$ on the line 31 and puts out a voltage $V_i$. This output voltage Vi corresponds to the current being fed to the laser 6 during reading.

Connected to the control voltage measuring circuit 33, the ADC 35 digitizes its output voltage $V_i$ preparatory to delivery to the controller 36. In practice the ADC 35 might be incorporated in the controller 36. The controller 36 is shown conventionally comprising a central processor unit 42, a random access memory 43, and a programmable ROM 44, performing various operations needed for read beam intensity target optimization according to the program to be detailed subsequently.

The EEPROM 37 is for storing various values needed for computation of an optimum read beam intensity target according to the invention. It also stores a write beam intensity target and the optimized read beam intensity target. Read out from this memory by the controller 36, the write and the read beam intensity targets are directed through the parallel-to-serial converter 39 to the DAC 38 and thence to the read beam control voltage generating circuit 21. Also, the controller 36 supplies offset compensation data to the DAC 34 via the parallel-to-serial converter 39 by time division multiplexing.

Figure 9:
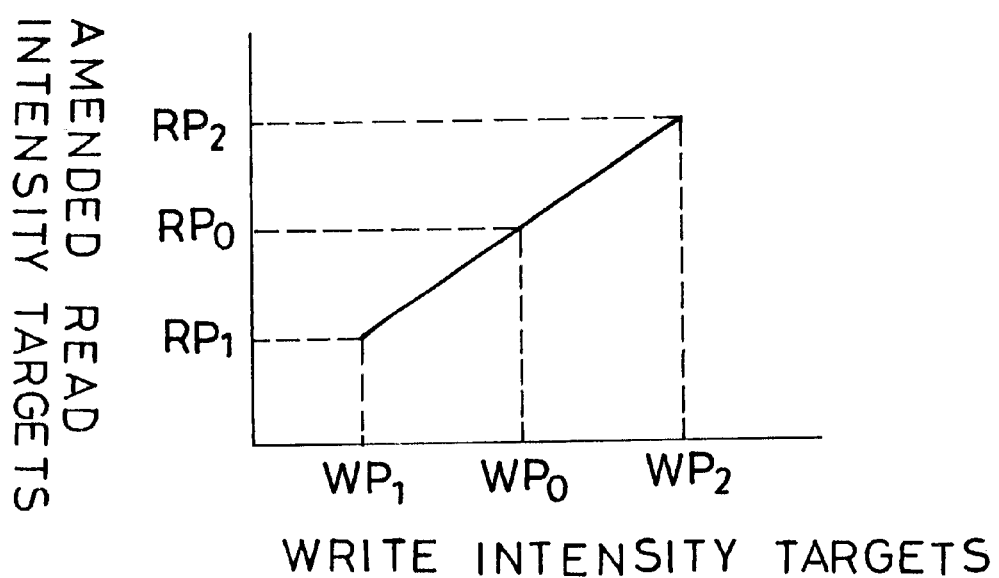
FIG. 9 is a graph indicating the relationship between write intensity targets and amended read intensity targets.

The controller 36 of the read beam intensity target generator 30 is connected to the write beam intensity target generator 18, FIG. 4, by way of the noted line 18a for setting a first reference write beam intensity target $WP_1$ and a second reference write beam intensity target $WP_2$, both indicated in FIG. 9, in relation to the actual write beam intensity target $WP_0$ being used at that time. The two reference write beam intensity targets $WP_1$ and $WP_2$ are used for the purpose of determination of an optimum read beam intensity target, not in actually writing on the disk 1.

Referring more specifically to FIG. 9, this graph is explanatory of how read beam intensity target optimization is made according to this invention. A first amended read beam intensity target $RP_1$ is first determined which corresponds to the first reference write beam intensity target $WP_1$, which is less than the actual write beam intensity target $WP_0$. Then a second amended read beam intensity target $RP_2$ is determined which corresponds to the second reference write beam intensity target $WP_2$, $WP_2$ being higher than $WP_0$. Then, on the bases of both first and second amended read beam intensity targets $RP_1$, and $RP_2$, an optimum read beam intensity target $RP_0$ is computed for use in pregroove reading and in combination with the actual write beam intensity target $WP_0$, as will become apparent from the subsequent description of the read beam intensity target amendment program.

Thus not just the actual write beam intensity target $WP_0$ but the two other reference write beam intensity targets $WP_1$ and $WP_2$, as well as the two corresponding amended read beam intensity targets $RP_1$ and $RP_2$, enter into consideration in computation of the optimum read beam intensity target $RP_0$. This is because the overshooting of the amplifier output waveform depends to a large measure upon the intensity of the write beam.

Figure 7:
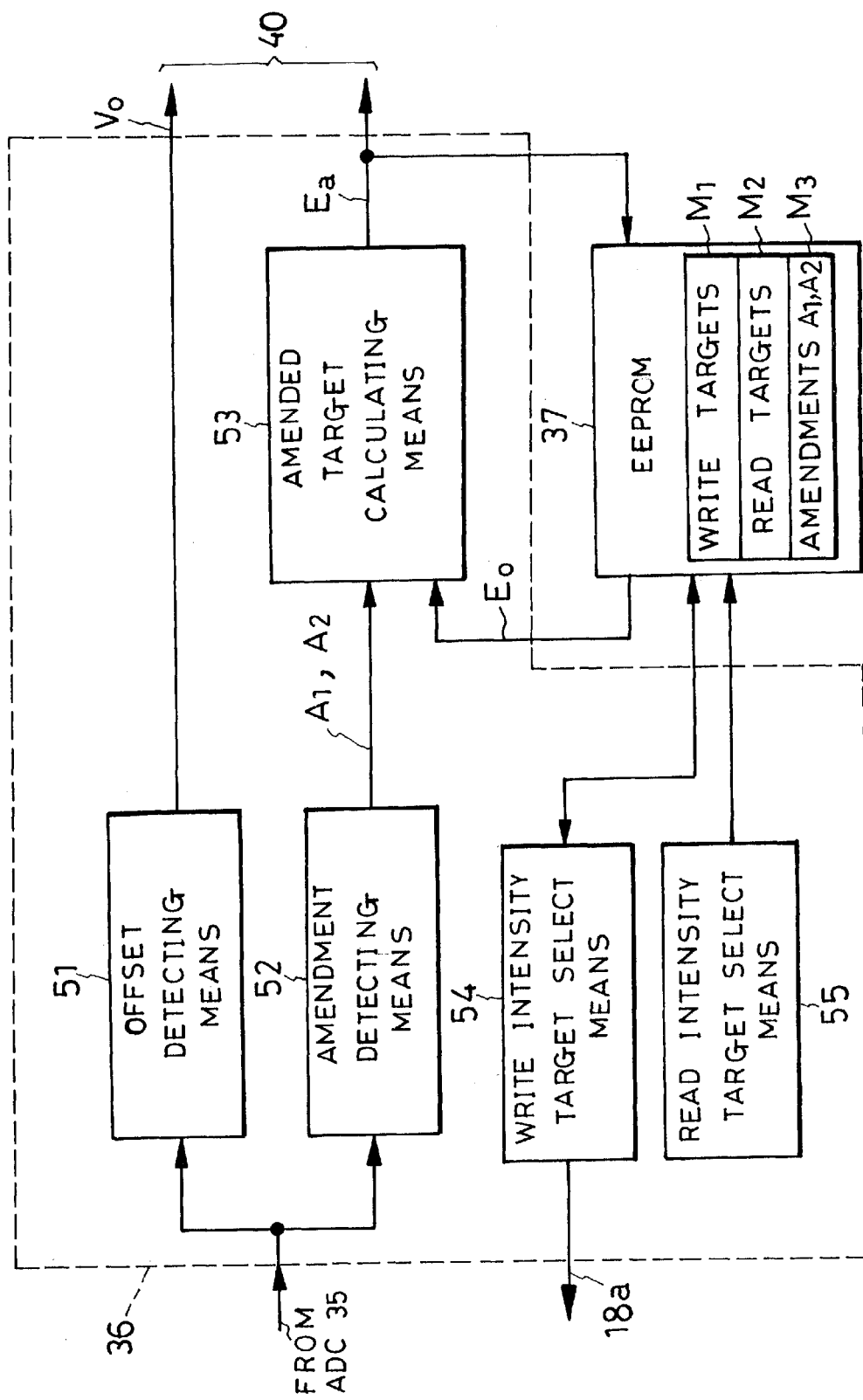
FIG. 7 is a block diagram equivalently showing the functions of the controller included in the FIG. 6 read target generator.

As indicated in FIG. 7, the controller 36 may be considered equivalently comprising the following means for implementation of the read beam intensity target optimization program as well as for read beam intensity control: offset detecting means 51, means 52 for detecting amounts of adjustment to be made, means 53 for computing optimum read beam intensity targets, means 54 for changing write beam intensity targets, and means 5 for changing read beam intensity targets. The functions of all these controller means will become apparent from the following description of the read beam intensity target optimization program according to the invention.

The optimization program is made up of two subprograms, one for determination of the two amended read beam intensity targets $RP_1$ and $RP_2$ at the two reference write beam intensity targets $WP_1$ and $WP_2$, and the other for computation of the optimum read beam intensity target $RP_0$. The read beam intensity target amendment subprogram will be described with reference to the flowchart which is shown divided into FIGS. 11A, 11B and 11C. The read beam intensity target optimization subprogram is flowcharted in FIG. 12.

Figure 10:
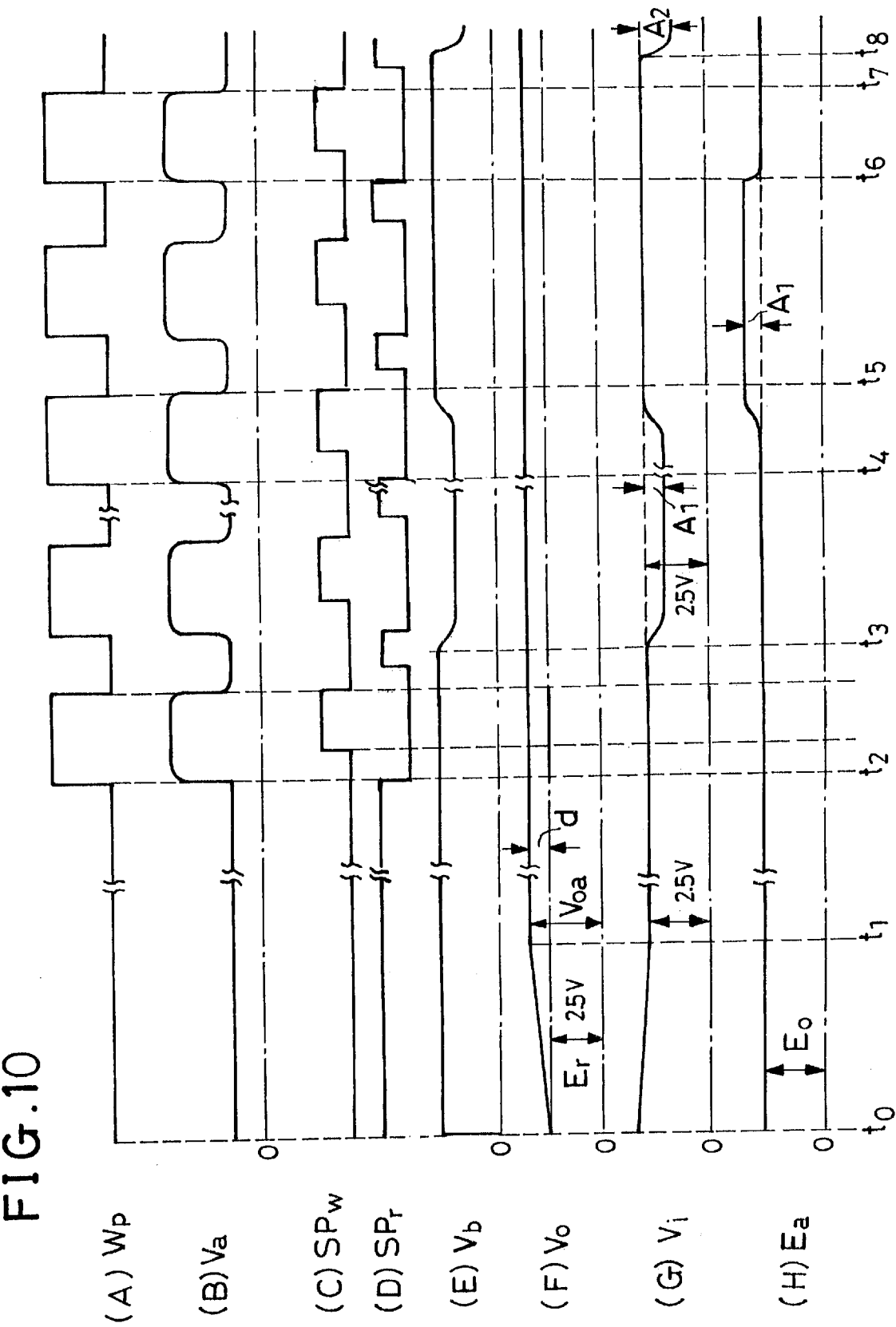
FIG. 10, consisting of (A) through (H), is a diagram of waveforms appearing in various parts of the laser beam intensity control system as depicted particularly in FIG. 6.
Figure 11A:
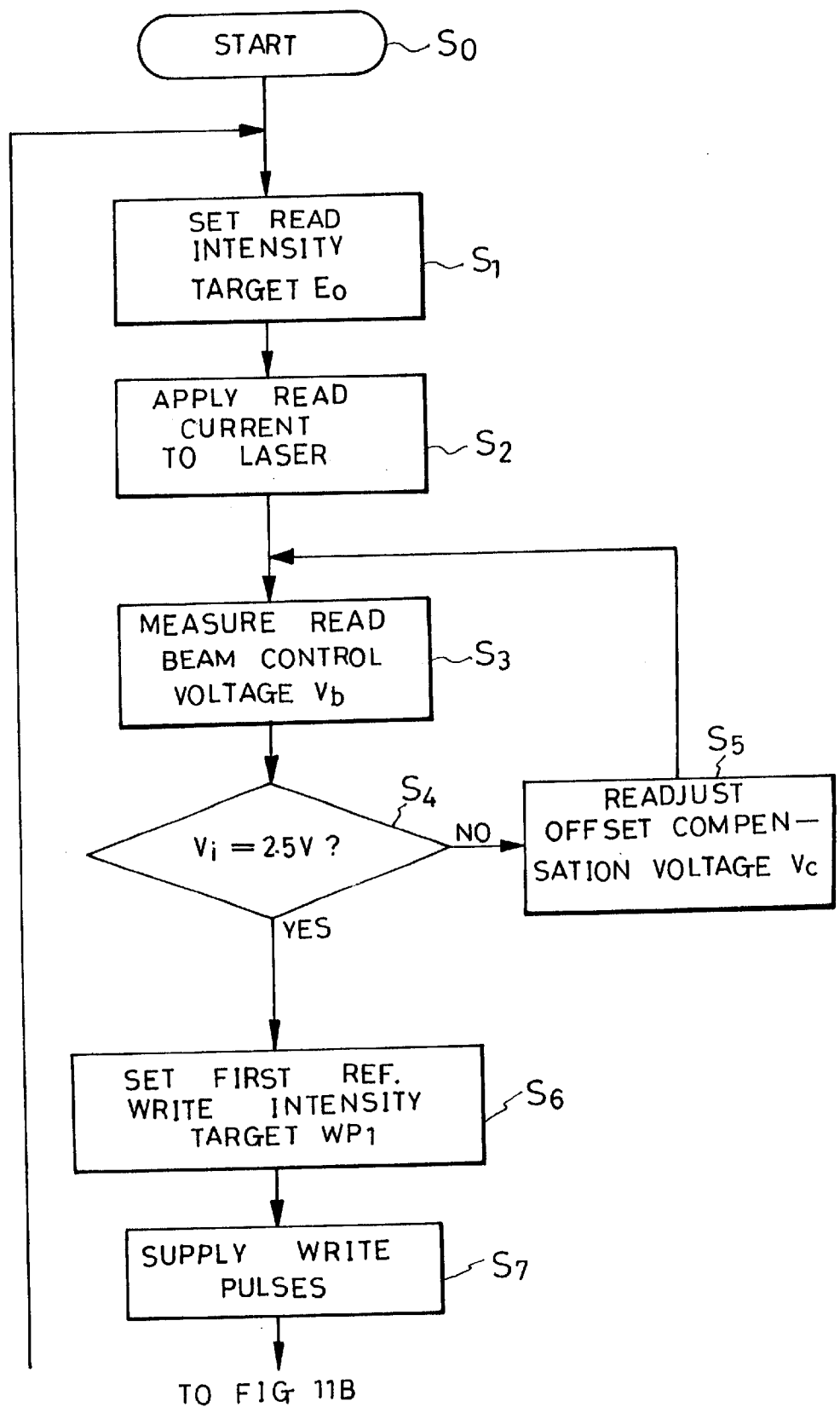
FIGS. 11A, 11B and 11C show in combination the flowchart of the read beam intensity target amendment program introduced into the FIGS. 6 and 7 controller.
Figure 11B:
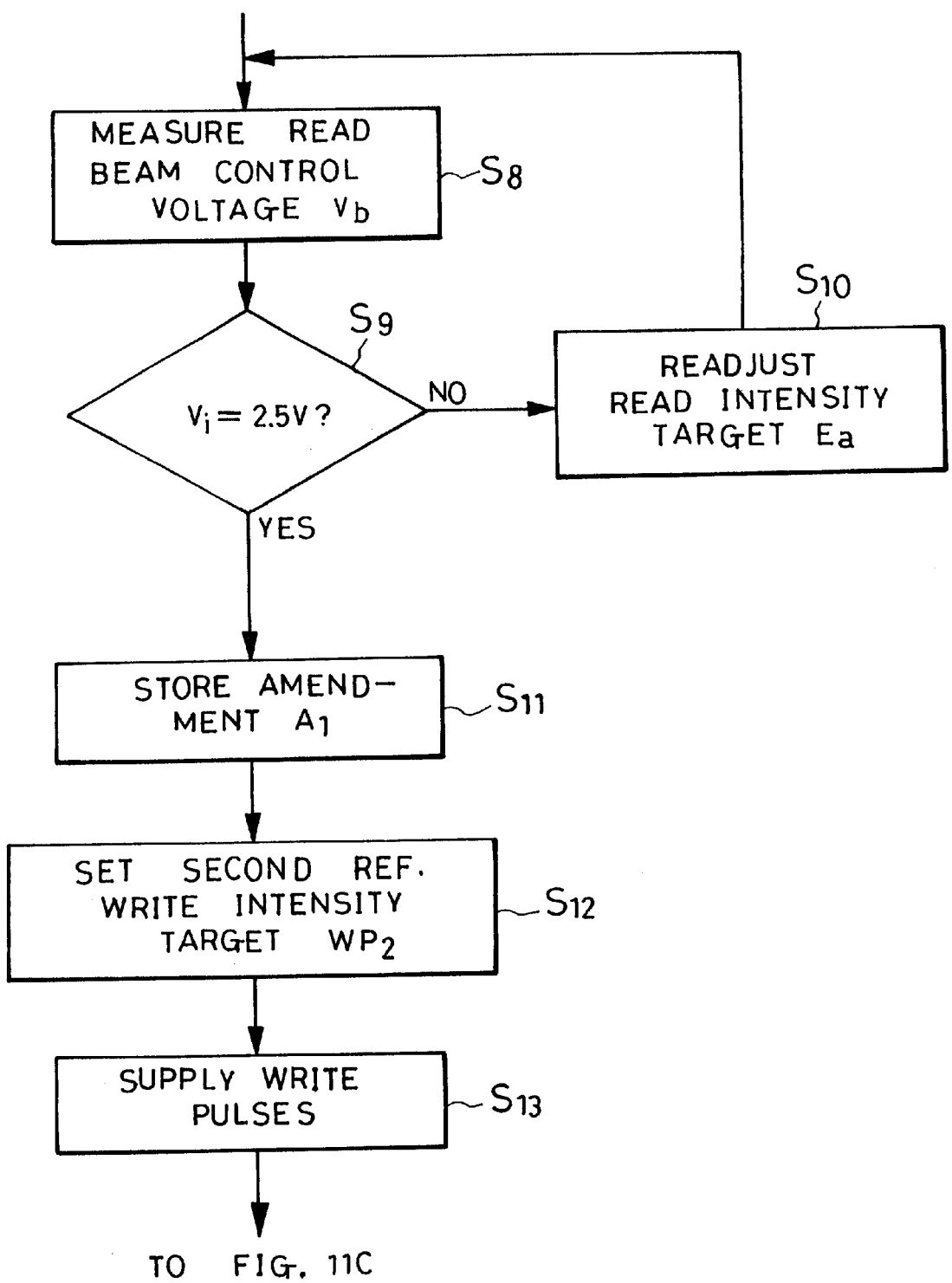
Figure 11C:
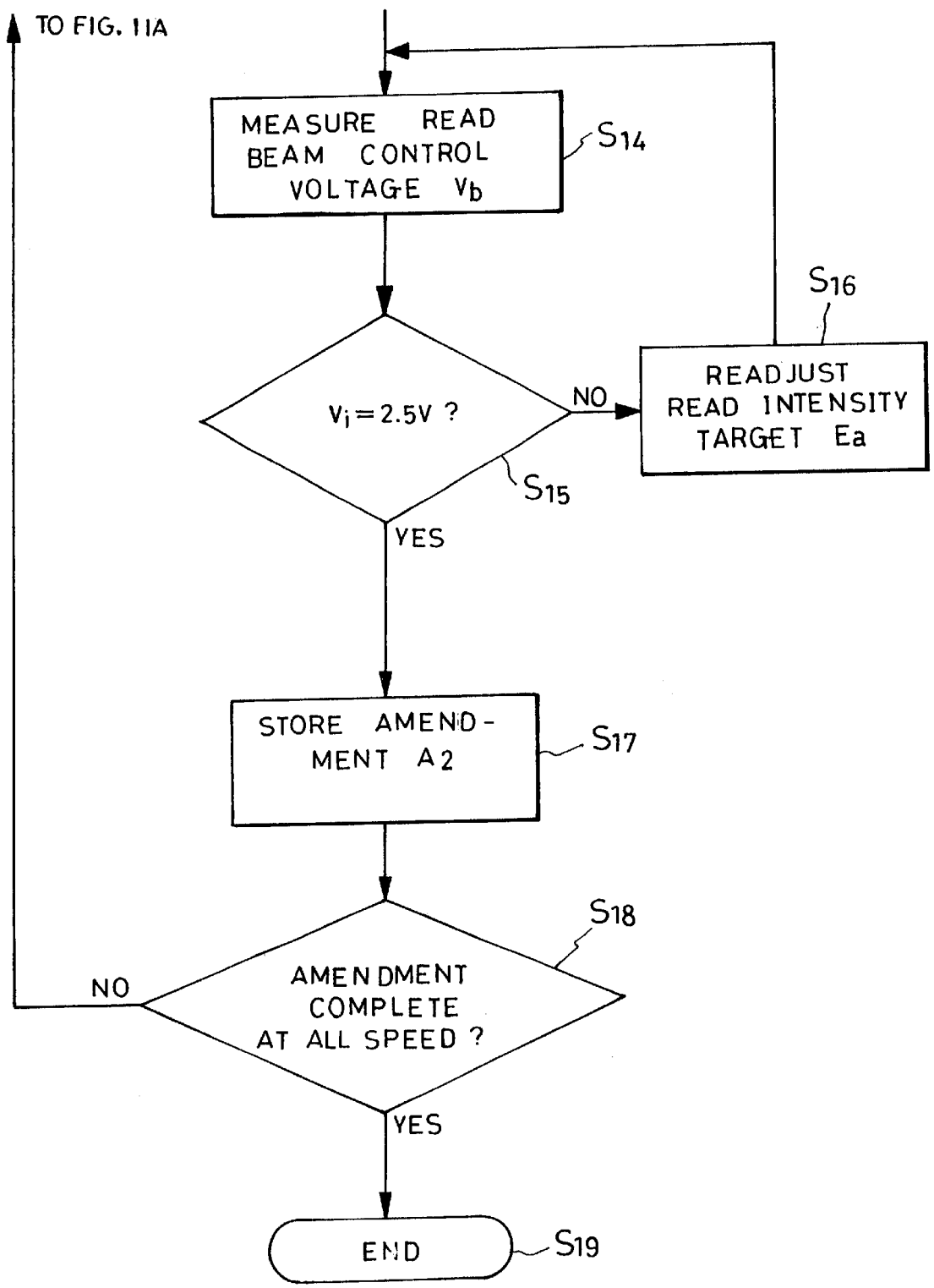

The ensuing description of the FIGS. 11A–11C flowchart will be better understood by referring also to FIG. 9, which is explanatory of how the actual optimum read beam intensity target is determined in relation to the actual write beam intensity and the two associated reference write beam intensities, and FIG. 10, a diagram showing time-correlated waveforms appearing in various parts of the ALPC depicted in FIGS. 4–7 during the execution of the read beam intensity target amendment subprogram.

It is recommended that read beam intensity target optimization according to these subprograms be made at a stable ambient temperature just before writing on the disk 1. Also, in cases where writing is to be done at several different scanning speeds, optimum read beam intensity targets should be ascertained for all such recording speeds and stored on the EEPROM 37, FIG. 6, of the read beam intensity target generator 30.

Reference is now directed more specifically to FIG. 11A for discussion of the read beam intensity amendment subprogram introduced into the controller 36 of the read beam intensity target generator 30. With the start of the subprogram at $S_0$ a preexisting normal read beam intensity target Eo for a first scanning speed, for instance, will be read out from the EEPROM 37, FIG. 6, by the controller 36 and thereby directed into the DAC 38 at a block $S_1$. The DAC 38 will then apply an analog equivalent Ea, FIG. 10(H), of the incoming digital normal read beam intensity target Eo to the differential amplifier 21a, FIG. 5, of the read beam control voltage generating circuit 21.

Then at block $S_2$ the diode laser 6 will be energized with a current of prescribed read magnitude from the driver circuit 19. There will now be started the automatic control of the read beam intensity by the feedback control loop comprising the monitoring photodetector 11, amplifier 12, read beam sample-and-hold circuit 20, read beam control voltage generating circuit 21, and laser driver circuit 19. The current now being applied from driver circuit 19 to laser 6 will be of the magnitude just enough to cause the laser to emit a read beam of the normal target intensity Eo.

The $t_0$–$t_2$ period in FIG. 10 represents an offset measurement period, during which no write pulses Wp are generated. Supplied with the output voltage Vb, FIG. 10(E), of the read beam control voltage generating circuit 21 during this period, the read beam control voltage measuring circuit 33, FIG. 6, of the read beam intensity target generator 30 will put out a voltage Vi, FIG. 10(G), representative of the difference between the read beam control voltage Vb and the offset compensation voltage Vo, FIG. 10(F), from the DAC 34.

Initially, as at to in FIG. 10, the offset compensation voltage Vo has a preset normal value of, say, 2.5 volts and varies thereafter with the output voltage Vi of the read beam control voltage measuring circuit 33. A control loop of the measuring circuit 33, ADC 35, controller 36, parallel-to-serial converter 39, and DAC 34 is thus formed during the $t_0$–$t_2$ period for control of the offset compensation voltage. The pulse generator circuit 23, FIG. 4, supplies no read sampling pulses SPr but provides a continuously high output during this period, as at FIG. 10(D), so that the ADC 35 will continuously detect the offset compensation voltage Vo. Both offset compensation voltage Vo and measuring circuit output voltage Vi will stabilize shortly after $t_0$, as at $t_1$.

The normal read intensity target Eo now being supplied from DAC 38 of the read intensity target generator 30 to read beam control voltage generating circuit 21 is understood to be constant during the $t_0$–$t_2$ period, causing the read beam control voltage generating circuit 21 to put out the read beam control voltage Vb of the normal 2.5 volts. The output voltage Vi of the read beam control voltage measuring circuit 33 will be higher than 2.5 volts during the $t_0$–$t_2$ period if then the read beam control voltage Vb is higher than 2.5 volts by reason of the offset of the read beam control voltage generating circuit 21. In this case, inputting measuring circuit output voltage Vi via the ADC 35, the controller 36 will deliver new offset compensation data, Vi–2.5 volts, to the DAC 34.

As the resulting offset compensation voltage Vo gradually rises as at FIG. 10(F) and finally equals the read beam control voltage Vb at $t_1$, the measuring circuit output voltage Vi will drop to the normal value of 2.5 volts. The controller 36 will hold the offset compensating DAC output voltage value Voa at, or shortly before, $t_2$ for use in subsequent laser control voltage measurement.

In FIG. 10(F) the DAC output voltage Voa minus 2.5 volts equals d, the offset due to the read beam control voltage generating circuit 21. The offset compensating DAC output voltage value Voa, or offset d, may be stored on the EEPROM 37, the RAM 43 of the controller 40, or the register of the parallel-to-serial converter 39.

The above described procedure of offset detection during the $t_1$–$t_2$ period of FIG. 10 is in accord with steps $S_3$, $S_4$ and $S_5$, FIG. 11A, of the amended read beam intensity amendment subprogram. After the measuring circuit output voltage Vi is found to be 2.5 volts at the node $S_4$, the first reference write beam intensity target $WP_1$ will be read out from the EEPROM 37 and set in the write beam intensity target generator 18, FIG. 4, at block $S_6$.

Then at block $S_7$ there will be started, as at $t_2$ in FIG. 10, the delivery of write pulses to the laser driver circuit 19 as well as to the read intensity target generator 30. These write pulses Wp, FIG. 10(A), should be the same as those actually used in recording on the disk 1. The driver circuit 19 will respond to the write pulses by energizing the diode laser 6 with a current that alternates between write magnitude and read magnitude. The resulting radiation of the laser need not, or should not, be applied to the disk 1, although the laser beam might be caused to irradiate other than the data storage zones of the disk until the end of the subprogram.

The next block $S_8$, FIG. 11B, dictates measurement of the read beam control voltage Vb, as at block $S_3$. This time, however, the offset compensation voltage Vo is fixed at Voa as at FIG. 10(F). The measuring circuit 33 will provide the voltage Vi indicative of the offset-free read beam control voltage Vb.

Figure 3:
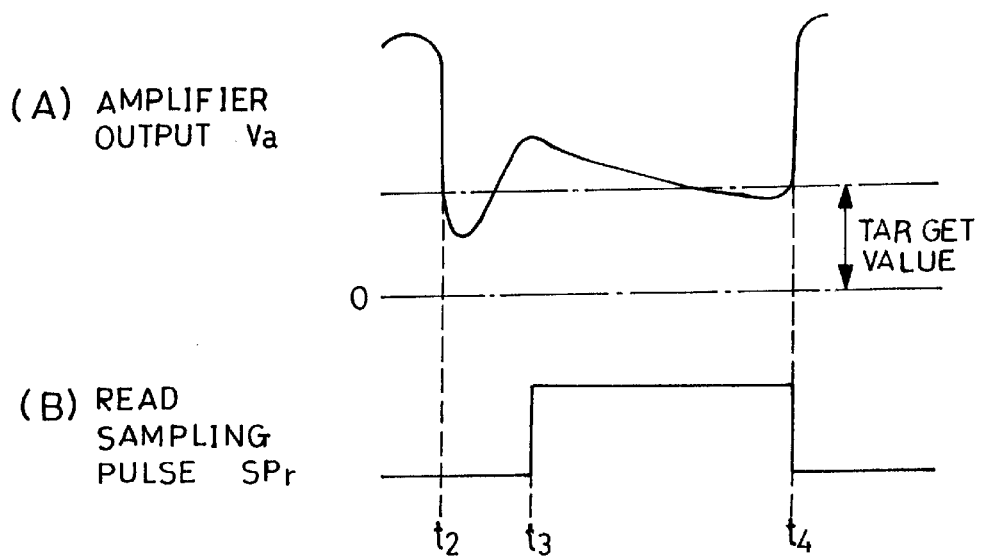
FIG. 3, consisting of (A) and (B), is a diagram of waveforms explanatory of how the offset of the prior art intensity control system occurs from the monitoring waveforms of the laser beam intensity.

As has been stated in connection with FIG. 3, the amplifier output voltage Va, FIG. 10(B), will have overshoots and undershoots as the laser drive current alternates between write magnitude and read magnitude with the supply of write pulses to the driver circuit 19. The overshoots and undershoots have so far adversely affected the feedback control of the read beam intensity. Therefore, according to this invention, the optimum read beam intensity target $RP_0$ is obtained based on the output voltage Vb of the read beam control voltage generating circuit 21 during the spacings of the write pulses. It is to be appreciated that the optimum target $RP_0$ is determined by actually supplying write pulses to the driver circuit 19, for later use in actually writing on the disk.

Then comes another node $S_9$ which asks whether the measuring circuit output voltage Vi has the normal value of 2.5 volts. At FIG. 10(E) is the read beam control voltage Vb shown to drop at $t_3$, with the consequent simultaneous drop of the measuring circuit output voltage Vi as at FIG. 10(G). The answer "no" to the node $S_9$ means that the read beam intensity target Ea now being supplied from DAC 38 to read beam control voltage generating circuit 21 is not good, requiring amendment of the read beam intensity target Ea at block $S_{10}$. The target amendment according to the block $S_{10}$ is conducted by the closed loop of the DAC 38, read beam control voltage generating circuit 21, voltage measuring circuit 33, ADC 35, controller 36, and parallel-to-serial converter 39, until the measuring circuit output voltage Vi rises back to 2.5 volts with a gradual rise of the read beam intensity target Ea from its normal value Eo, as at FIG. 10(H).

The measuring circuit output voltage Vi is shown at FIG. 10(G) to return to 2.5 volts at $t_5$ with the rise of the read beam intensity target Ea by $A_1$. Thereupon, at block $S_{11}$, the target voltage Ea indicative of the first amended read beam intensity target $RP_1$ will be stored on the EEPROM 37. This first amended read target $RP_1$ has now turned out to be the normal read beam intensity target Eo plus the amendment $A_1$.

Then at block $S_{12}$ the second reference write beam intensity target $WP_2$ will be set so that the amplifier output voltage Va, FIG. 10(B), will be as high as from $t_5$ to $t_7$. The second reference write beam intensity target $WP_2$ will be retrieved from the EEPROM 37 and delivered to the write intensity target generator 18.

Then at block $S_{13}$ the write pulses will be applied to the laser driver circuit 19, as after time $t_5$ in FIG. 10. The laser 6 will now be energized according to the second reference write beam intensity target $WP_2$.

The following steps $S_{14}$–$S_{17}$, FIG. 11C, of this read intensity target amendment subprogram are akin to the steps $S_8$–$S_{11}$, FIG. 11B, except for the difference in reference write beam intensity target. No repeated explanation of these steps are considered necessary except to say that the second amended read intensity target $RP_2$ is stored on the EEPROM 37 at block $S_{17}$ when the measuring circuit output voltage Vi becomes 2.5 volts at node $S_{15}$. The second amended read beam intensity target $RP_2$ is the normal read beam intensity target Eo plus an amendment $A_2$.

Then at node $S_{18}$ it is asked whether all the foregoing steps $S_1$–$S_{17}$ have been conducted for all the predetermined recording speeds at which the disk is to be driven in this disk drive. In other words, the steps $S_1$–$S_{17}$ are repeated at each of the recording speeds. The read beam intensity target amendment subprogram ends at $S_{19}$ after the two amended read beam intensity targets $RP_1$ and $RP_2$ have been ascertained for each and every recording speed.

Figure 12:
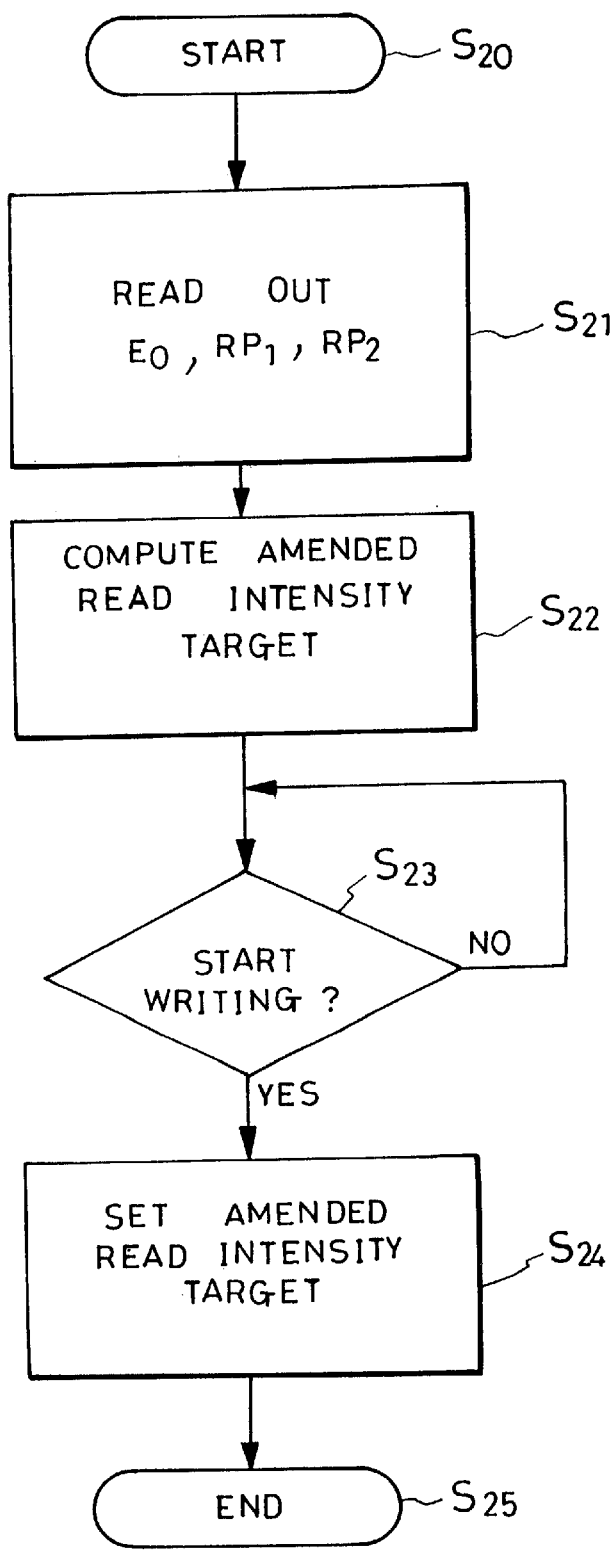
FIG. 12 is a flowchart of the read beam intensity target optimization program which is to be executed after the read beam intensity target amendment program.

Then comes the read beam intensity target optimization subprogram of FIG. 12. Starting at $S_{20}$, the target optimization subprogram dictates at $S_{21}$ the retrieval of the normal read beam intensity target Eo and first and second amended read beam intensity targets $RP_1$ and $RP_2$.

Then at block $S_{22}$ the optimum read beam intensity target $RP_0$ will be computed by the equation:

$$RP_0 = [(RP_2 - RP_1)/(WP_2 - WP_1)] \times (WP_0 - WP_1) + RP_1.$$

This equation is, however, not an essential feature of the invention. The optimum read beam intensity target might be determined by other methods, such as directly from the adjustments $A_1$ and $A_2$ stored on the EEPROM 37.

With the optimum read beam intensity target $RP_0$ determined as above, recording may now be started. In response to the answer "yes" to the next node $S_{23}$, the optimum target $RP_0$ will be set as on the register of the parallel-to-serial converter 39 at block $S_{24}$. The laser beam intensity will be maintained at this optimum target $RP_0$ during the pregroove reading that proceeds concurrently with the subsequent recording of user data on the disk 1. The target optimization subprogram comes to an end at $S_{25}$.

Figure 13A:
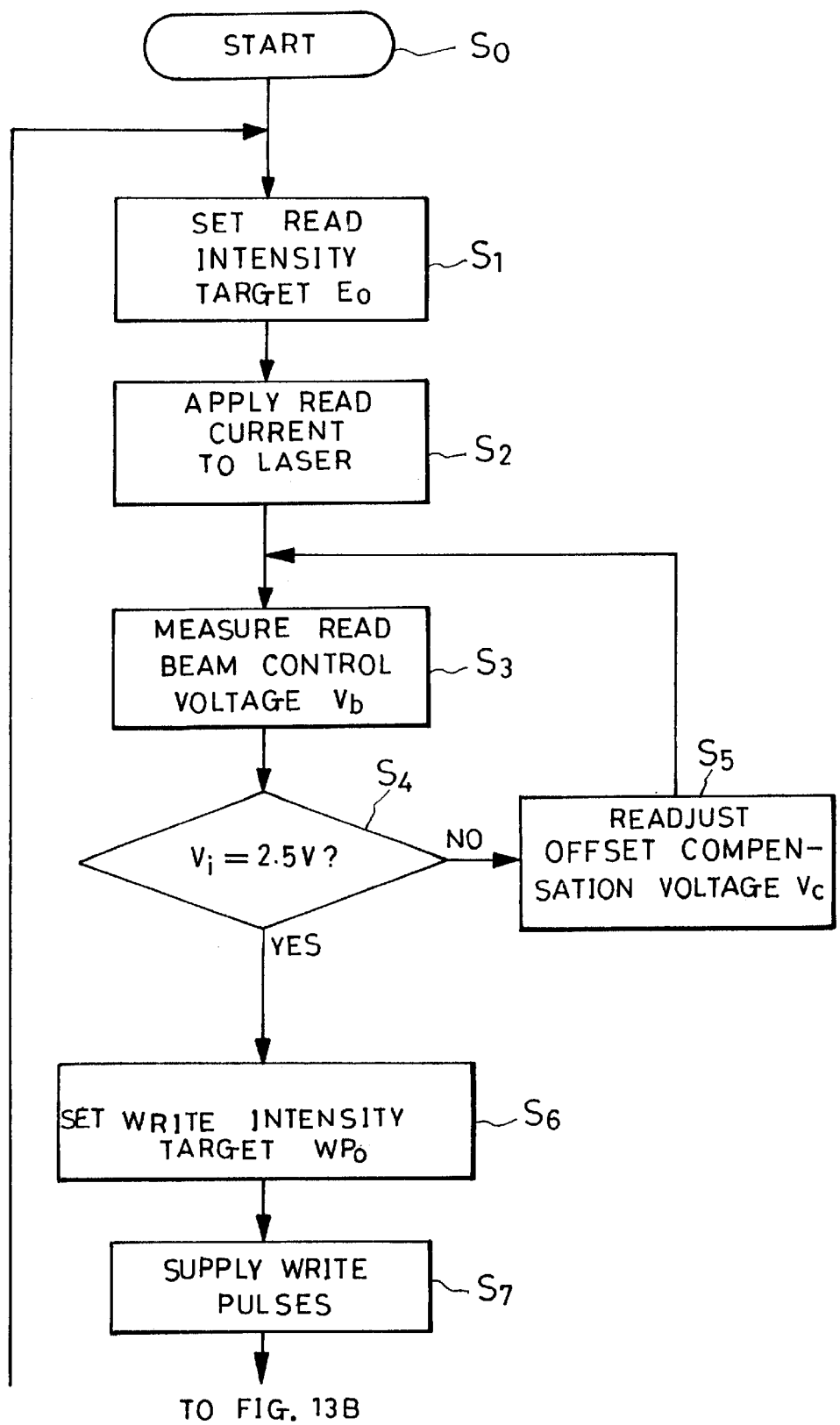
FIGS. 13A and 13B are a flowchart of an alternative read beam intensity target amendment program according to the invention.
Figure 13B:
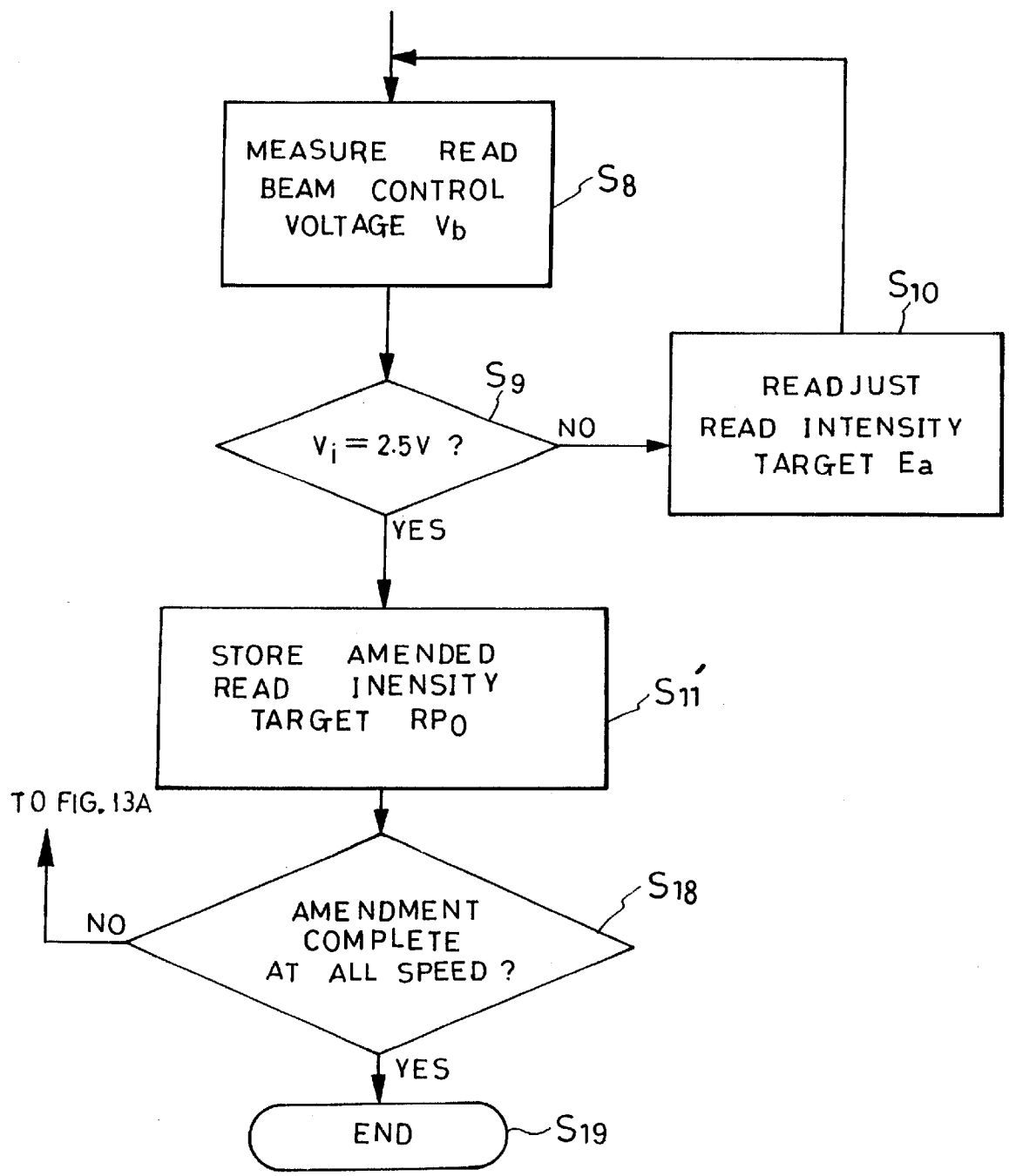

FIGS. 13A and 13B show an alternate read beam intensity target optimization program according to this invention, suitable for implementation in the CD-R drive constructed substantially as set forth above with reference to FIGS. 4–6. This alternate program differs from the first disclosed program mainly in that an optimum read beam intensity program is determined directly for the actual write beam intensity target $WP_0$ without relying on the two reference write beam intensity targets $WP_1$ and $WP_2$.

A comparison of FIG. 13A with FIG. 11A will reveal that both programs include the same steps $S_1$–$S_5$ for detection of the offset d, as from $t_0$ to $t_2$ in FIG. 10. Then at block $S_6'$ of the alternate program the actual write beam intensity target $WP_0$, instead of the first reference write beam intensity target $WP_1$, will be supplied from the write beam intensity target generator 18, FIG. 4. An operation similar to that of the $t_2$–$t_5$ period of FIG. 10 will occur as the pulse generator circuit 23 starts production of write pulses according to block $S_7$.

Then at blocks $S_8$–$S_{10}$ the read beam intensity target Ea being produced by the read beam intensity target generator 30 will be readjusted until the measuring circuit output voltage becomes 2.5 volts. Then at block $S_{11}'$ there will be stored on the EEPROM 37 the amended target generator output Ea, that is, the optimum read beam intensity target $RP_0$. The foregoing procedure is repeated as required for each of all the other prescribed recording speeds according to node $S_{18}$ before the program comes to an end at $S_{19}$. In subsequently recording on the disk 1 at any desired speed, the optimum read beam intensity target $RP_0$ that has been determined at that speed is to be read out from the EEPROM 37 and delivered to the DAC 38.

Despite the foregoing detailed disclosure it is not desired that the present invention be limited by the exact showing of the drawings or the description thereof. The following is a brief lift of possible modifications which are all believed to fall within the scope of the invention:

1. The control system offset d could be obtained during the $t_0$–$t_2$ period in FIG. 10, and the optimum read beam intensity target determined accordingly. The read beam intensity target would then be Eo+d.

2. The normal value of the DAC output voltage Vo could be zero instead of 2.5 volts. Two and a half volts is preferred, however, because then it is easier to measure large variations in the read beam control voltage Vb.

3. Read beam target amendment could be made with only one write pulse, instead of a plurality of pulses shown in FIG. 10.

What is claimed is:

1. In an apparatus utilizing a beam of light for optically writing and reading information on a rotating disk, a light beam intensity control system comprising:

(a) a light source;

(b) a pulse generator for generating a series of write pulses;

(c) a driver circuit connected to the light source for causing the same to emit a light beam of consistently read intensity and, in response to the write pulses, of alternating write intensity and read intensity;

(d) beam intensity detector means optically coupled to the light source for providing an actual write intensity signal indicative of actual write intensity of the light beam, and an actual read intensity signal indicative of actual read intensity of the light beam;

(e) a write intensity target generator for generating a write intensity target signal indicative of a target value at which the write intensity of the light beam is to be held;

(f) a write intensity control circuit connected to the beam intensity detector means and the write intensity target generator for finding a difference between the actual write intensity signal and the write intensity target signal, and to the driver circuit for causing the same to control the write intensity of the light beam according to the difference found;

(g) a read intensity target generator for generating a read intensity target signal indicative of a target value at which the read intensity of the light beam is to be held;

(h) a read intensity control circuit connected to the beam intensity detector means and the read intensity target generator for finding a difference between the actual read intensity signal and the read intensity target signal, and to the driver circuit for applying thereto a read intensity control signal thereby to cause the driver circuit to control the read intensity of the light beam according to the difference found;

(i) means included in the read intensity target generator and connected to the read intensity control circuit for detecting an offset component of the read intensity control signal; and (j) means included in the read intensity target generator for amending the read intensity target signal so as to cancel the detected offset component of the read intensity control signal.

2. The light beam intensity control system of claim 1 wherein the offset component of the read intensity control signal is detected when the light source is emitting a light beam of consistently read intensity.

3. The light beam intensity control system of claim 1 wherein the offset component of the read intensity control signal is detected when the light source is emitting a light beam of alternating read intensity and write intensity in response to the write pulses.

4. The light beam intensity control system of claim 1 wherein the offset component of the read intensity control signal is detected both when the light source is emitting a light beam of consistently read intensity and when the light source is emitting a light beam of alternating read intensity and write intensity in response to the write pulses.

5. In an apparatus utilizing a beam of light for optically writing and reading information on a rotating disk, a light beam intensity control system comprising:

(a) a light source;

(b) a pulse generator for generating a series of write pulses;

(c) a driver circuit connected to the light source for causing the same to emit a light beam of consistently read intensity and, in response to the write pulses, of alternating write intensity and read intensity;

(d) beam intensity detector means optically coupled to the light source for providing an actual write intensity signal indicative of actual write intensity of the light beam, and an actual read intensity signal indicative of actual read intensity of the light beam;

(e) a write intensity target generator for generating a write intensity target signal indicative of a target value at which the write intensity of the light beam is to be held;

(f) a write intensity control circuit connected to the beam intensity detector means and the write intensity target generator for finding a difference between the actual write intensity signal and the write intensity target signal, and to the driver circuit for causing the same to control the write intensity of the light beam according to the difference found;

(g) a read intensity target generator for generating a read intensity target signal indicative of a target value at which the light intensity of the light beam is to be held;

(h) a read intensity control circuit connected to the beam intensity detector means and the read intensity target generator for finding a difference between the actual read intensity signal and the read intensity target signal, and to the driver circuit for applying thereto a read intensity control signal thereby to cause the driver circuit to control the read intensity of the light beam according to the difference found;

(i) a measuring circuit included in the read intensity target generator and connected to the read intensity control circuit for measuring the read intensity control signal; and (j) controller means included in the read intensity target generator and connected to the measuring circuit for detecting an offset component included in the read intensity control signal and for amending the read intensity target signal so as to cancel the offset component.

6. The light beam intensity control system of claim 5 wherein the measuring circuit is a differential amplifier having a first input connected to the read intensity control circuit, and wherein the controller means comprises:

(a) an analog-to-digital converter;

(b) a controller having an input connected to the measuring circuit via the analog-to-digital converter;

(c) a first digital-to-analog converter having an input connected to the controller, and an output connected to a second input of the differential amplifier, for supplying to the differential amplifier a normal value signal and the resultant of the normal value signal and the offset component of the read intensity control signal; and (d) a second digital-to-analog converter having an input connected to the controller and an output connected to the read intensity control circuit for supplying the read intensity target signal, both amended and unamended, to the read intensity control circuit;

(e) the controller causing the first digital-to-analog converter to supply the normal value signal to the differential amplifier when the light source is producing a light beam of consistently read intensity, in order to find the offset component of the read intensity control signal and to supply the resultant of the offset component and the normal value signal to the differential amplifier, and determining an optimum read intensity target signal, for delivery to the read intensity control circuit via the second digital-to-analog converter, on the basis of an output from the differential amplifier when the light source is producing a light beam of alternating read intensity and write intensity.

7. The light beam intensity control system of claim 6 wherein the controller of the controller means comprises:

(a) means for causing the write intensity target generator to generate a first reference write intensity target, lower than a predetermined actual write intensity target, and a second reference write intensity target, higher than the actual write intensity target, when the light source is producing a light beam of alternating read intensity and write intensity;

(b) means for determining a first amended read intensity target on the basis of the output from the differential amplifier when the write intensity target generator is generating the first reference write intensity target, and a second amended read intensity target on the basis of the output from the differential amplifier when the write intensity target generator is generating the second reference write intensity target; and (c) means for determining the optimum read intensity target at the actual write intensity target from the first and the second amended read intensity targets.

8. In an optical disk apparatus having a light source for emitting a beam of light for writing and reading information on a rotating optical disk, and a driver circuit for causing the light source to emit a light beam of consistently read intensity or of alternating write intensity and read intensity, a method of controlling the intensity of the light beam which comprises:

(a) providing beam intensity detector means capable of producing an actual write intensity signal indicative of actual write intensity of the light beam, and an actual read intensity signal indicative of actual read intensity of the light beam;

(b) finding a difference between the actual read intensity of the light beam and a read intensity target at which the read intensity of the light beam is to be held;

(c) applying to the driver circuit a read intensity control signal indicative of the difference between the actual read intensity and the read intensity target in order to control the read intensity of the light beam according to the difference;

(d) detecting an offset component of the read intensity control signal; and (e) amending the read intensity target according to the detected offset component of the read intensity control signal.

9. The light beam intensity control method of claim 8 wherein the offset component of the read intensity control signal is detected when the light source is emitting a light beam of consistently read intensity.

10. The light beam intensity control method of claim 8 wherein the offset component of the read intensity control signal is detected when the light source is emitting a light beam of alternating read intensity and write intensity.

11. The light beam intensity control method of claim 8 wherein the offset component of the read intensity control signal is detected both when the light source is emitting a light beam of consistently read intensity and when the light source is emitting a light beam of alternating read intensity and write intensity in response to the write pulses.

12. In an optical disk apparatus having a light source for emitting a beam of light for writing and reading information on a rotating optical disk, a driver circuit for causing the light source to emit a light beam of consistently read intensity or of alternating write intensity and read intensity, and a read intensity control circuit for applying a read intensity control voltage to the driver circuit to cause the same to control the read intensity of the light beam according to a difference between the actual read intensity of the light beam and a read intensity target at which the read intensity of the light beam is to be held, a method of controlling the intensity of the light beam which comprises:

(a) causing the light source to emit a light beam of consistently read intensity;

(b) finding the difference (Vi) between the read intensity control voltage (Vb) and an offset compensation voltage (Vo);

(c) readjusting the offset compensation voltage (Vo) until the difference (Vi) has a prescribed normal voltage;

(d) setting a first reference write intensity target ($WP_1$) at which the write intensity of the light beam is to be held and which is lower than an actual write intensity target ($WP_0$) to be used in subsequently recording on the disk;

(e) causing the light source to emit a light beam of alternating write intensity and read intensity;

(f) finding the difference (Vi) between the read intensity control voltage (Vb) and the readjusted offset compensation voltage (Vo);

(g) amending the read intensity target (Ea) until the difference (Vi) has the normal voltage;

(h) storing the amendment ($A_1$) made on the read intensity target at step (g);

(i) setting a second reference write intensity target ($WP_2$) at which the write intensity of the light beam is to be held and which is higher than the actual write intensity target ($WP_0$);

(j) causing the light source to emit a light beam of alternating write intensity and read intensity;

(k) finding the difference (Vi) between the read intensity control voltage (Vb) and the readjusted offset compensation voltage (Vo);

(l) amending the read intensity target (Ea) until the difference (Vi) has the normal voltage;

(m) storing the amendment ($A_2$) made on the read intensity target at step (l);

(n) computing an optimum read intensity target, for use with the actual write intensity target, from the stored amendments ($A_1$ and $A_2$).

13. The light beam intensity control method of claim 12 wherein the optimum read intensity target is computed by the equation $$RP_0 = [(RP_2 - RP_1)/(WP_2 - WP_1)] \times (WP_0 - WP_1) + RP_1$$

where $RP_0$=the optimum read intensity target for the actual write intensity target, $RP_1$=the first amended read intensity target ($Eo + A_1$) as determined at the first reference write intensity target, $RP_2$=the second first amended read intensity target ($Eo + A_2$) as determined at the second reference write intensity target, $WP_0$=the actual write intensity target, $WP_1$=the first reference write intensity target, and $WP_2$=the second reference write intensity target.

* * * * *